US012123438B2

(12) United States Patent
Nakano et al.

(10) Patent No.: US 12,123,438 B2
(45) Date of Patent: Oct. 22, 2024

(54) WORK MACHINE

(71) Applicant: HITACHI CONSTRUCTION MACHINERY CO., LTD., Tokyo (JP)

(72) Inventors: Hisami Nakano, Tsuchiura (JP); Hiroaki Tanaka, Kasumigaura (JP); Yusuke Suzuki, Tsuchiura (JP); Akihiro Narazaki, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 659 days.

(21) Appl. No.: 17/435,714

(22) PCT Filed: Sep. 4, 2020

(86) PCT No.: PCT/JP2020/033672
§ 371 (c)(1),
(2) Date: Sep. 2, 2021

(87) PCT Pub. No.: WO2021/059931
PCT Pub. Date: Apr. 1, 2021

(65) Prior Publication Data

US 2022/0154742 A1 May 19, 2022

(30) Foreign Application Priority Data

Sep. 24, 2019 (JP) ................................ 2019-173082

(51) Int. Cl.
*E02F 3/43* (2006.01)
*F15B 21/02* (2006.01)

(52) U.S. Cl.
CPC ................ *F15B 21/02* (2013.01); *E02F 3/43* (2013.01)

(58) Field of Classification Search
CPC ....... E02F 3/34; E02F 9/20; E02F 9/26; F15B 21/02; G06F 3/0484
See application file for complete search history.

(56) References Cited

U.S. PATENT DOCUMENTS 6,169,948 B1 * 1/2001 Fujishima ................ E02F 9/26 340/684
2013/0302124 A1 11/2013 Matsuyama
(Continued)

FOREIGN PATENT DOCUMENTS

JP 2016-003442 A 1/2016
JP 2018-003514 A 1/2018
(Continued)

OTHER PUBLICATIONS

International Search Report of PCT/JP2020/033672 dated Nov. 24, 2020.
(Continued)

*Primary Examiner* — Tan Q Nguyen
(74) *Attorney, Agent, or Firm* — MATTINGLY & MALUR, PC

(57) ABSTRACT

A main controller generates a supplemented design face that passes through a junction or above the junction between a first design face and a second design face adjacent to each other, among a plurality of design faces, the supplemented design face having one end thereof positioned on the first design face and another end thereof positioned on the second design face, sets a curvature 1/R of the supplemented design face according to an arm operation amount of an operation lever device, and executes semi-automatic excavation control to control a boom cylinder with one of the faces included in the supplemented design face being set as the target face.

9 Claims, 12 Drawing Sheets

(56) References Cited

U.S. PATENT DOCUMENTS

| | | | | |
|---|---|---|---|---|
| 2014/0107841 | A1 | 4/2014 | Danko | |
| 2014/0142817 | A1* | 5/2014 | Matsuyama | E02F 3/437 701/50 |
| 2016/0040398 | A1* | 2/2016 | Kitajima | E02F 3/435 701/50 |
| 2019/0127946 | A1 | 5/2019 | Sakai et al. | |
| 2019/0177948 | A1 | 6/2019 | Matsuyama | |
| 2023/0160184 | A1* | 5/2023 | Kadono | E02F 9/2041 701/50 |

FOREIGN PATENT DOCUMENTS

| | | | |
|---|---|---|---|
| WO | 2012/127913 | A1 | 9/2012 |
| WO | 2018/101313 | A1 | 6/2018 |

OTHER PUBLICATIONS

International Preliminary Report on Patentability received in corresponding International Application No. PCT/JP2020/033672 dated Apr. 7, 2022.

* cited by examiner (a)

(b)

(c)

(d)

(a)

(b)

(c)

(a)

(b)

(a)

(b)

(c)

WORK MACHINE

TECHNICAL FIELD

The present invention relates to a work machine including a work device such as a hydraulic excavator.

BACKGROUND ART

When construction of a design face is conducted by use of a hydraulic excavator which is a representative work machine, a control system is known in which a front work device is semi-automatically operated by correcting operator operation by use of three-dimensional data on the design face (three-dimensional design data) and excavation forming work according to the design face is executed. As an example of this control system, there is a system in which, when an arm is operated based on an operator's arm operation, a control to correct an operation direction of a working point (for example, bucket claw tip) set on the front work device by, for example, automatically adding a boom raising operation such that the working point does not enter the design face, or such that the working point is moved along the design face, is conducted (hereinafter such a control may be referred to as "semi-automatic excavation control").

Incidentally, in general, a section of design data on a terrain profile includes a plurality of design faces. For example, the sectional view of a river embankment includes at least three design faces, namely, a riverbed (a flat surface flooded at a time of swollen water (flood channel)), the top surface of the levee (levee crown), and the inclined surface connecting them (riverside slope). In the construction based on the design data including such a plurality of design faces, the forming work needs to be conducted such that the bucket does not enter either of two adjacent design faces of different inclinations before and after the bucket passes through the junction between the design faces.

In connection with such a kind of demand, Patent Document 1 discloses an excavation control system in which a first candidate velocity is acquired from the distance between the first design face and the bucket, a second candidate velocity is acquired from the distance between the second design face and the bucket, either one of the first candidate velocity and the second candidate velocity is selected as a limit velocity based on the relations of each of the first design face and the second design face, and the bucket, and the relative velocity of the bucket relative to the design face according to the selected limit velocity is limited to the selected limit velocity.

Further, as a specific example of selection of the limit velocity described above, Patent Document 1 discloses (1) selection of the limit velocity according to the design face which is closer to the bucket, of the two design faces, and (2) selection of the limit velocity according to the design face for which the velocity of boom raising (adjusted velocity corresponding to the target velocity of the boom cylinder) automatically conducted for an operator's arm operation is greater, of the two design faces.

PRIOR ART DOCUMENT

Patent Document

Patent Document 1: WO 2012/127913

SUMMARY OF THE INVENTION

Problem to be Solved by the Invention

However, in the excavation control system disclosed in Patent Document 1, a target velocity of the boom cylinder may be suddenly changed when the bucket passes through the junction between the two design faces. Thus, the bucket may possibly enter either of the design faces, depending on the operator's operation amount. This point will be described by taking as an example a case of excavating two design faces with different inclinations as depicted in FIG. 12.

First, in a case where the design face which is closer to the bucket, of the two design faces, is selected according to the method of (1) above, when the forming work has been conducted while the distance between the bucket and one of the design faces is kept 0, the other design face is selected at a timing when the bucket comes into contact with the other design face and the distance thereto becomes 0. An example of variation in the velocity command value (the target velocity of the boom cylinder) required for the boom in this case is depicted in FIG. 13(*a*). An instant of changeover of the design face corresponds to a part surrounded by a dotted-line circle, and a sudden change in the velocity command value (target velocity) is generated around the changeover of the design face.

Next, in a case where the design face for which the velocity of boom raising automatically conducted is greater, of the two design faces, is selected according to the method of (2) above, an example of variation in the velocity command value required for the boom at a time of changeover of the design face is depicted in FIG. 13(*b*). Similarly to FIG. 13(*a*), an instant of changeover corresponds to a part surrounded by a dotted-line circle. In this case, since the design face is changed over at an earlier timing as compared to the case of FIG. 13(*a*), variation in the velocity command value is restrained as compared to the case of FIG. 13(*a*), but a sudden velocity change is still generated.

In addition, even if any one of the methods (1) and (2) above is adopted, when the variation in the velocity command value required for the boom is rapid, the actual motion of the boom cannot follow up the variation, and the bucket may possibly enter the design face selected after changeover. Even in such a case, if the operator loosens the arm operation to reduce the arm velocity before the design face is changed over, a possibility of preventing the bucket from entering the design face may be enhanced. In that case, however, the operation demanded for the operator becomes cumbersome, and the arm velocity is lowered, so that work amount may be reduced.

The present invention has been made in consideration of the above problems. It is an object of the present invention to provide a work machine capable of semi-automatic excavation control, with which a working point (for example, bucket claw tip) can be prevented from entering either of the two design faces having different inclinations, irrespectively of an operator's operation amount, when the working point (bucket claw tip) passes through a junction between the two design faces, and with which work amount can also be prevented from being reduced.

Means for Solving the Problem

The present application includes a plurality of means for solving the above problem, and there is provided as one example thereof, a work machine including: a work device;

a plurality of actuators that drive the work device; an operation device that operates the plurality of actuators; and a controller that controls driving of at least one of the plurality of actuators. The controller is configured to generate a supplemented design face that passes through a junction or above the junction between a first design face and a second design face adjacent to each other among a plurality of design faces prescribed on an operation plane of the work device, the supplemented design face having one end thereof positioned on the first design face and another end thereof positioned on the second design face, set a curvature of the supplemented design face according to an operation amount of the operation device, set a target face on the supplemented design face, and execute semi-automatic excavation control to control at least one of the plurality of actuators such that a working point set on the work deice is maintained on the target face or above the target face.

Advantages of the Invention

According to the present invention, it is possible to prevent the working point from entering either of the two design faces having different inclinations, irrespectively of an operator's operation amount, when the working point passes through the junction between the two design faces, and also to prevent a work amount from being reduced.

MODES FOR CARRYING OUT THE INVENTION

Embodiments of the present invention will be described below.

First Embodiment

Figure 1:
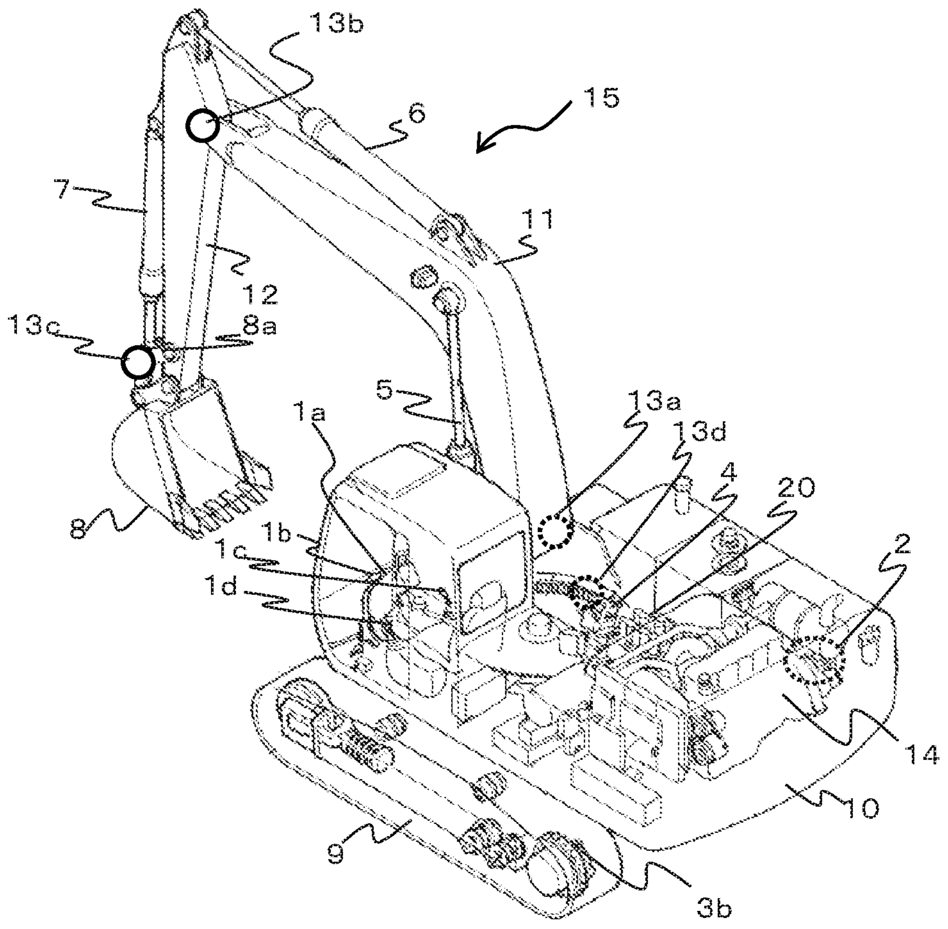
FIG. 1 is a perspective view depicting a work machine according to a first to a third embodiment of the present invention.

FIG. 1 is a perspective view depicting a work machine according to a first embodiment of the present invention. As illustrated in FIG. 1, the work machine according to the present embodiment includes a lower track structure 9 and an upper swing structure 10 which constitute a machine body, and an articulated work device (front work device) 15 including a plurality of front members 11, 12, and 8.

The lower track structure 9 has left and right crawler type track devices which are driven by left and right track hydraulic motors **3*b* and 3*a* (only 3*b*** on the left side is illustrated).

The upper swing structure 10 is swingably mounted on the lower track structure 9 and is driven to swing by a swing hydraulic motor 4. An engine 14 as a prime mover, a hydraulic pump device 2 (a first hydraulic pump **2*a* and a second hydraulic pump 2*b* (see FIG. 2)) driven by the engine 14, a control valve 20, and a controller 500 (see FIGS. 2, 3, and the like) that performs various kinds of control of a hydraulic excavator, are mounted on the upper swing structure 10**.

The work device 15 is swingably attached to a front portion of the upper swing structure 10. The work device 15 has an articulated structure having a boom 11, an arm 12 and a bucket 8 which are swingable front members. The boom 11 swings relative to the upper swing structure 10 by elongation and contraction of a boom cylinder 5, the arm 12 swings relative to the boom 11 by elongation and contraction of an arm cylinder 6, and the bucket 8 swings relative to the arm 12 by elongation and contraction of a bucket cylinder 7. In other words, the boom cylinder 5, the arm cylinder 6, and the bucket cylinder 7 drive the plurality of front members 11, 12, and 8 constituting the work device 15.

For computing a position of a point (working point) set on the work device 15 in the controller 500, the hydraulic excavator includes a first posture sensor **13*a* that is provided, for example, in the vicinity of a junction between the upper swing structure 10 and the boom 11 and that detects an angle of the boom 11 (boom angle) relative to a horizontal plane, a second posture sensor 13*b* that is provided, for example, in the vicinity of a junction between the boom 11 and the arm 12 and that detects an angle of the arm 12 (arm angle) relative to the horizontal plane, a third posture sensor 13*c* that is provided, for example, on a bucket link 8*a* connecting the arm 12 and the bucket 8 and that detects an angle of the bucket link 8*a* (bucket angle) relative to the horizontal plane, and a machine body posture sensor 13*d* that detects an inclination angle of the upper swing structure 10 (roll angle, pitch angle) relative to the horizontal plane. Note that, as the posture sensors 13*a* to 13*d*, for example, IMUs (Inertial Measurement Units) can be used. In addition, the first posture sensor 13*a* to the third posture sensor 13*c*** may be sensors (for example, potentiometers) that detect relative angles.

The angles detected by these posture sensors **13*a* to 13*d* are inputted to an information processing section 100 in the controller 500** to be described later, as posture data including boom angle data, arm angle data, bucket angle data, and machine body angle data.

The upper swing structure 10 is provided with a cab. A track right operation lever device 1*a*, a track left operation lever device 1*b*, a right operation lever device 1*c*, a left operation lever device 1*d*, and the like are disposed in the cab as operation devices for operating the work device 15 (front members 11, 12, and 8), the upper swing structure 10, and the lower track structure 9. The track right operation lever device 1*a* is for instructing the right track hydraulic motor 3*a* to operate, the track left operation lever device 1*b* is for instructing the left track hydraulic motor 3*b* to operate, the right operation lever device 1*c* is for instructing the boom cylinder 5 (boom 11) and the bucket cylinder 7 (bucket 8) to operate, and the left operation lever device 1*d* is for instructing the arm cylinder 6 (arm 12) and the swing hydraulic motor 4 (upper swing structure 10) to operate. The operation devices 1*a* to 1*d* of the present embodiment are electric levers which generate operation signals (voltage signals) according to each operation amount inputted by the operator for the operation devices 1*a* to 1*d* (operation amounts of the operation devices 1*a* to 1*d*), and output the operation signals to the controller 500. Note that the operation devices 1*a* to 1*d* may be of a hydraulic pilot type, and operation amounts thereof may be detected by pressure sensors and inputted to the controller 500.

The control valve 20 is a valve unit including a plurality of directional control valves (for example, directional control valves 21, 22, and 23 in FIG. 2 to be described later) for controlling flows (flow rates and directions) of hydraulic working fluids supplied from the hydraulic pump device 1 to the respective hydraulic actuators such as the swing hydraulic motor 4, the boom cylinder 5, the arm cylinder 6, the bucket cylinder 7, and the left and right track hydraulic motors 3*a* and 3*b* aforementioned. The directional control valves inside the control valve 20 are driven by signal pressures generated by solenoid proportional valves (for example, solenoid proportional valves 21*a* to 23*b* to be described later in FIG. 2) based on command currents (control valve driving signals) outputted from the controller 500, and control the flows (flow rates and directions) of the hydraulic working fluids supplied respectively to the hydraulic actuators 3 to 7. The driving signals outputted from the controller 500 are generated based on operation signals (operation information) outputted from the operation lever devices 1*a* to 1*d*.

Figure 2:
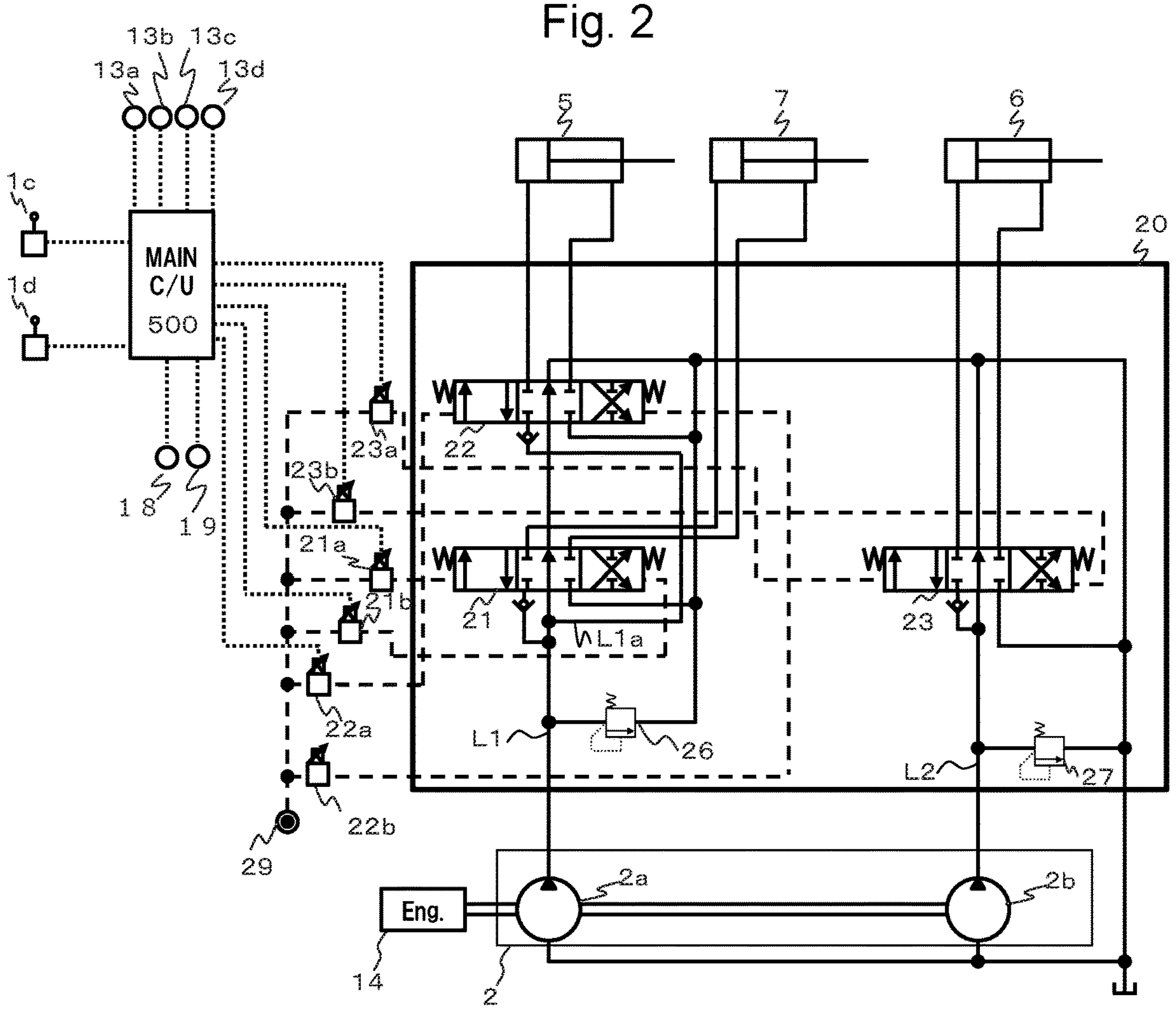
FIG. 2 is a configuration diagram depicting a hydraulic driving system mounted on the work machine depicted in FIG. 1.

FIG. 2 is a configuration diagram of a hydraulic driving system of the hydraulic excavator illustrated in FIG. 1. Note that, for simplification of explanation, a configuration including only the boom cylinder 5, the arm cylinder 6, and the bucket cylinder 7 as the hydraulic actuators will be described, and illustration and a description of a drain circuit and the like not related directly to the embodiment of the present invention will be omitted. In addition, a description of a load check valve and the like similar in configuration and operation to conventional hydraulic driving systems are omitted.

In the hydraulic driving system in FIG. 2, the hydraulic pump device 2 includes the first hydraulic pump 2*a* and the second hydraulic pump 2*b*. The first hydraulic pump 2*a* and the second hydraulic pump 2*b* are driven by the engine 14, and respectively supply hydraulic working fluids to a first pump line L1 and a second pump line L2. In the present embodiment, the first hydraulic pump 2*a* and the second hydraulic pump 2*b* are described as fixed displacement hydraulic pump, but the present invention is not limited to this, and the hydraulic pumps 2*a* and 2*b* may be configured by use of variable displacement hydraulic pumps.

The control valve 20 is provided with two systems of pump lines, namely, the first pump line L1 and the second pump line L2. A boom directional control valve 22 that controls the flow (flow rate and direction) of the hydraulic working fluid supplied to the boom cylinder 5 and a bucket directional control valve 21 that controls the flow of the hydraulic working fluid supplied to the bucket cylinder 7 are connected to the first pump line L1. As a result, the hydraulic working fluid delivered by the first hydraulic pump 2*a* is supplied to the boom cylinder 5 and the bucket cylinder 7. Similarly, an arm directional control valve 23 that controls the flow of the hydraulic working fluid supplied to the arm cylinder 6 is connected to the second pump line L2, and the hydraulic working fluid delivered by the second hydraulic pump 2*b* is supplied to the arm cylinder 6. Note that the boom directional control valve 22 and the bucket directional control valve 21 are configured to be capable of dividing the flow by a parallel circuit L1*a*.

In addition, relief valves 26 and 27 are individually connected respectively to the first pump line L1 and the second pump line L2. When the respective pressures in the pump lines L1 and L2 reach a preset relief pressure, the respective relief valves 26 and 27 are opened, to permit the hydraulic working fluid to escape to a tank.

The boom directional control valve 22 is operated by signal pressures generated by the solenoid proportional valves 22*a* and 22*b*. Similarly, the arm directional control valve 23 is operated by signal pressures of the solenoid proportional valves 23*a* and 23*b*, and the bucket directional control valve 21 is operated by signal pressures of the solenoid proportional valves 21*a* and 21*b*.

These solenoid proportional valves 21*a* to 23*b* reduce the pressure of a pilot hydraulic working fluid (primary pressure) supplied from a pilot hydraulic pressure source 29 based on a command current (control valve driving signal) outputted from the main controller 500, and output the signal pressures generated in that way to the directional control valves 21 to 23.

The right operation lever device 1*c* outputs voltage signals according to the operation amount and the operation direction of the operation lever to the main controller 500 as boom operation amount data and bucket operation amount data. Similarly, the left operation lever 1*d* outputs a voltage signal according to the operation amount and the operation direction of the operation lever to the main controller 500 as arm operation amount data.

The main controller 500, based on the operation amount data on the front members 11, 12, and 8 inputted from the operation lever devices 1*c* and 1*d*, the design face position data (design face data) inputted from a design face setting device 18, hydraulic excavator posture data inputted from angle sensors 13*a* to 13*d*, and size data concerning the sizes of the hydraulic excavator and inputted from a machine body information storage device 19, calculates command signals (command currents) for controlling the solenoid proportional valves 21*a* to 23*b*, and outputs the calculated command signals to the solenoid proportional valves 21*a* to 23*b*.

(Design Face Setting Device 18)

The design face setting device 18 is a device utilized for setting a design face prescribing the completed shape of a terrain profile (working object) and for storing position data of the set design face (design face data), and outputs the design face data to the main controller 500. The design face data is data prescribing the three-dimensional shape of the design face, and in the present embodiment, includes position information and angle information of the design face. In the present embodiment, the position of the design face is assumed to be defined as relative distance information in relation to the upper swing structure 10 (hydraulic excavator 1) (in other words, position data on the design face in a coordinate system (machine body coordinate system) set on the upper swing structure 10 (hydraulic excavator 1)), and the angle of the design face is assumed to be defined as relative angle information in relation to the gravity direction, but data obtained by appropriate conversion may also be utilized, including a case where the position is the position coordinates on the earth (in other words, the position coordinates in the global coordinate system) and a case where the angle is a relative angle in relation to the machine body.

Note that it is sufficient for the design face setting device 18 to have a function of storing preset design face data, and the design face setting device 18 can be replaced by, for example, a storage device such as a semiconductor memory. Therefore, for example, when the design face data is stored in a storage device in the controller 500 or a storage device mounted in the hydraulic excavator, the design face setting device 18 can be omitted.

(Machine Body Information Storage Device 19)

The machine body information storage device 19 is a device utilized for storing preliminarily measured size data on each of the sections (for example, the lower track structure 9, the upper swing structure 10, each of front members 11, 12, and 8 constituting the front work device 15) constituting the hydraulic excavator, and outputs the size data to the main controller 500.

(Main Controller 500)

The main controller 500 is a controller that performs various kinds of control concerning the hydraulic excavator. The main controller 500 is configured to be able to perform a control (herein sometimes referred to as "semi-automatic excavation control" or "machine control") of setting, as a target face, one of a plurality of design faces prescribed on an operation plane of the front work device 15, calculating target velocities concerning the front members 11, 12, and 8 (for example, target velocities of the hydraulic cylinders 5, 6, and 7 (target actuator velocities)) such that a movement range of a working point (for example, the claw tip of the bucket 8) set on the front work device 15 is maintained on the target face or above the target face, and controlling the work device 15 (namely, the hydraulic cylinders 5, 6, and 7) based on the target velocities. In other words, in the semi-automatic excavation control, for example, when the claw tip of the bucket 8 is selected as the working point and the operator inputs an arm crowding operation, the work device 15 is semi-automatically controlled such that the bucket claw tip (bucket tip) is moved along the target face, without especially operating other front members. Thus, excavation along the design face is possible without depending on the skill of the operator. Hereinafter, a description will be continued by posing, as an example, a case where the claw tip of the bucket 8 is set as the working point.

Note that the operation plane of the front work device 15 is a plane on which each of the front members 11, 12, and 8 operates, namely, a plane which is orthogonal to all of the three front members 11, 12, and 8 and, from among such planes, for example, a plane passing through the center in the width direction of the front work device 15 (the center in the axial direction of a boom pin) can be selected.

Figure 3:
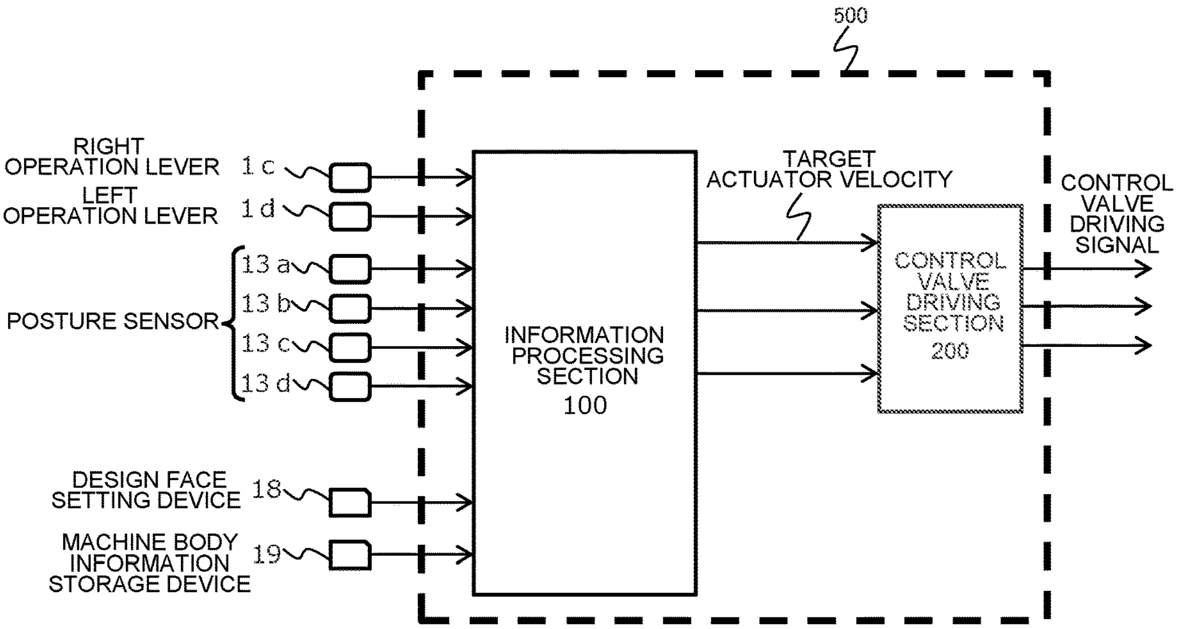
FIG. 3 is a configuration diagram depicting a controller mounted on the work machine depicted in FIG. 1.

FIG. 3 is a configuration diagram of the main controller 500 mounted on the hydraulic excavator depicted in FIG. 1. The main controller 500 is, for example, configured by use of hardware including a CPU (Central Processing Unit) not illustrated, a storage device such as a ROM (Read Only Memory) or an HDD (Hard Disc Drive) for storing various kinds of programs for the CPU to execute processing, and a RAM (Random Access Memory) serving as a working area when the CPU executes the programs. By executing the programs stored in the storage device in this way, functions of an information processing section 100 that calculates a target actuator velocity to allow the bucket 8 to move along the target face and a control valve driving section 200 that generates a driving signal for the control valve 20 according to the calculated target actuator velocity, are realized. Next, the details of the information processing section 100 will be described.

(Information Processing Section 100)

The information processing section 100 calculates target actuator velocities for the hydraulic cylinders 5, 6, and 7 based on operation amount data from the operation lever devices 1*c* and 1*d*, posture data from the posture sensors 13*a* to 13*d*, design face data from the design face setting device 18, and size data from the machine body information storage device 19, and outputs them to the control valve driving section 200. The control valve driving section 200 generates a control valve driving signal according to the target actuator velocities, and drives the control valve 20.

Figure 4:
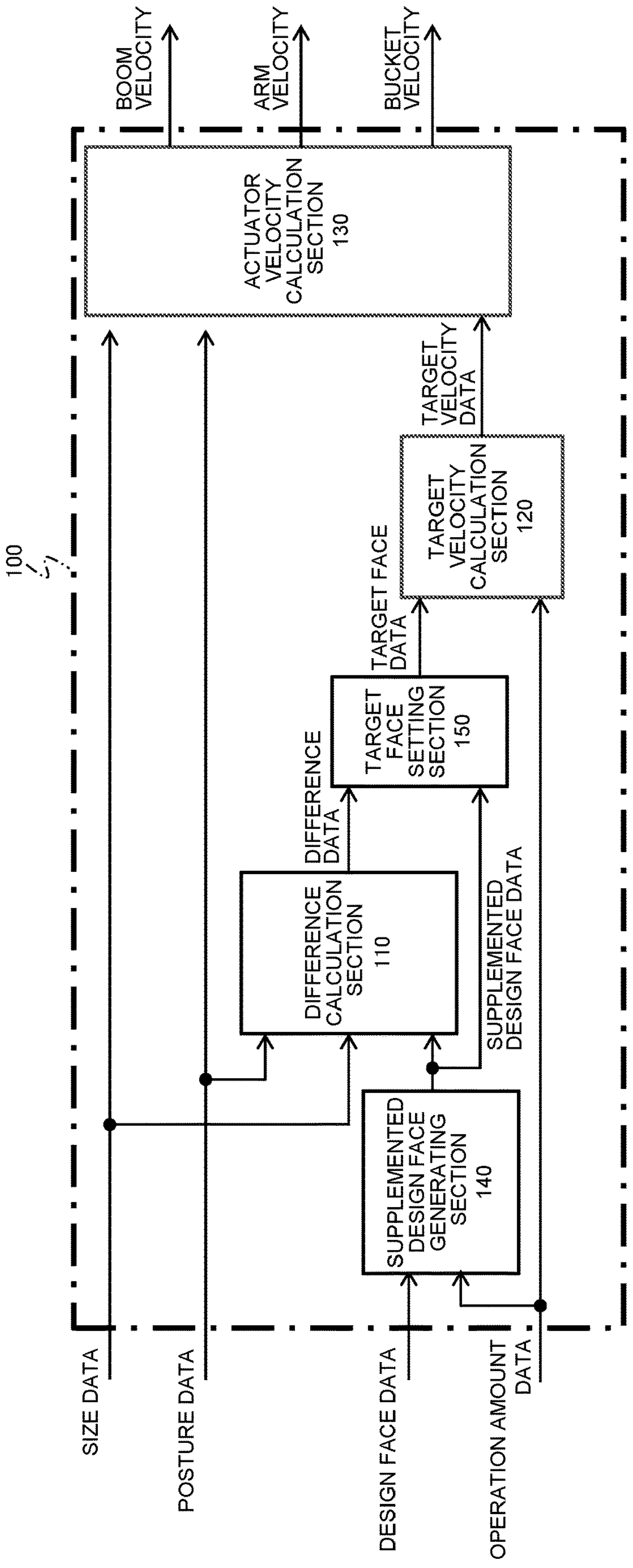
FIG. 4 is a block diagram depicting a detailed configuration of an information processing section depicted in FIG. 3 in the first embodiment.

The details of the information processing section 100 will be described with reference to FIG. 4. The information processing section 100 includes a difference calculation section 110, a target velocity calculation section 120, an actuator velocity calculation section 130, a supplemented design face generating section 140, and a target face setting section 150. Outputs from the actuator velocity calculation section 130 are outputted from the information processing section 100 as target actuator velocities (boom velocity, arm velocity, and bucket velocity) for the hydraulic cylinders 5, 6, and 7. Hereinafter, the difference calculation section 110, the target velocity calculation section 120, the actuator velocity calculation section 130, and the target face setting section 150 will be outlined, and the supplemented design face generating section 140 will be described in detail.

(Supplemented Design Face Generating Section 140)

The supplemented design face generating section 140 newly generates a face (hereinafter referred to as a "supplemented design face") passing through a junction between two design faces (a first design face and a second design face) adjacent to each other and having different inclination angles or above the junction, based on design face data and operation amount data, and outputs the data (supplemented design face data). Here, the "junction" means a part where the two design faces adjacent to each other are connected, the part appearing in a liner shape in three dimension.

Hereinafter, for simplicity, it is assumed that all the design faces included in design face data concerning generation of a supplemented design face are parallel to respective rotational axes of the boom 11, the arm 12, and the bucket 8. In this case, the "design face" and the "junction" included in the design face data can be rephrased as a "line segment" intersecting a plane orthogonal to the corresponding rotational axis and the "intersection." However, it is to be noted that, in general, in the case of intending to enhance construction accuracy, the position and the posture of the machine body are secured such that the bucket tip end side becomes parallel to each design face. Accordingly, the above assumption is established in many cases, and the plane can be treated as equivalent to the line segment. With this assumption as a preposition, generation of a supplemented design face by the supplemented design face generating section 140 will be described in detail with reference to FIG. 5.

Figure 5:
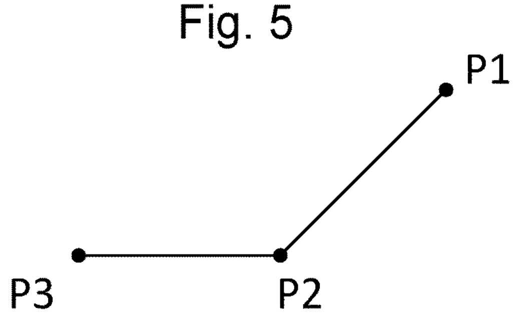
FIG. 5 is a diagram depicting a supplementing method for a design face junction in the first embodiment.
Figure 5:
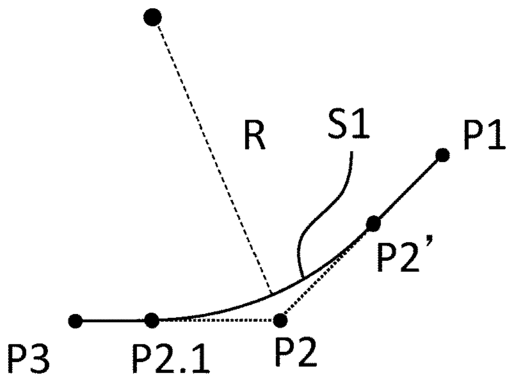
Figure 5:
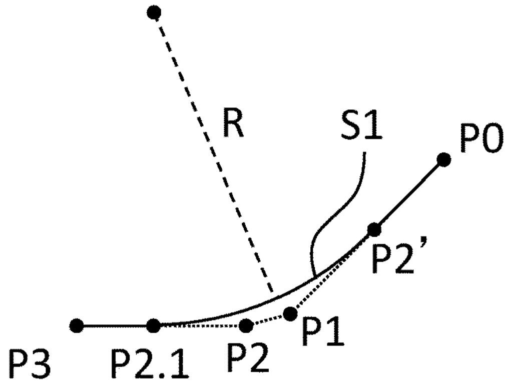
Figure 5:
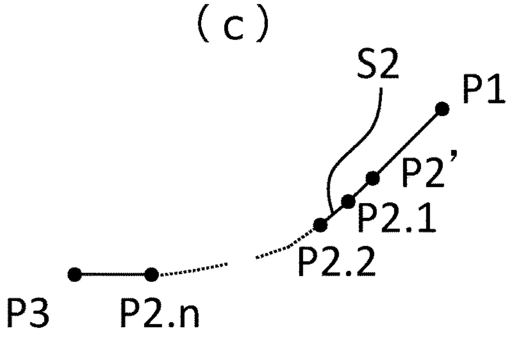

As illustrated in FIG. 5(*a*), it is assumed that a face (section) where design face data from the design face setting device 18 and an operation plane of the front work device 15 intersect includes two design faces P1P2 and P2P3 consisting of two line segments P1P2 and P2P3. The two design faces P1P2 and P2P3 are mutually adjacent faces having different inclination angles, and are connected at a junction P2. In this instance, the supplemented design face generating section 140 generates a supplemented design face S1 which passes above the junction P2 between the two design faces P1P2 and P2P3 (in other words, located above the junction P2), has one end portion P2' located on one design face (first design face) P1P2 and has the other end portion P2.1 located on the other design face (second design face) P2P3. In the example of FIG. 5(*b*), such processing as to determine a face obtained by rounding a corner of the junction P2 between the two design faces P1P2 and P2P3 is conducted, whereby a circular arc P2'P2.1 touching the two line segments P1P2 and P2P3 and having both ends P2' and P2.1 located on the line segments P1P2 and P2P3, respectively, as depicted in FIG. 5(*b*), is generated as the supplemented design face S1.

(Curvature 1/R of Supplemented Design Face S1)

The supplemented design face generating section 140 sets the curvature 1/R of the supplemented design face S1 (circular arc P2'P2.1) according to the operation amount data from the operation lever devices 1*c* and 1*d* when generating the supplemented design face S1. However, it is to be noted that, in the present embodiment, the curvature 1/R of the supplemented design face S1 is set according to the arm operation amount data from the operation lever device 1*d*. The supplemented design face S1 of FIG. 5(*b*) is the circular arc P2'P2.1, the radius of which is R. Note that, when the supplemented design face S1 is a curved line which is not a circular arc, the inverse of the radius of curvature which is the radius of a circle approximating a part of the curved line is the curvature.

The maximum of the curvature 1/R of the supplemented design face S1 can be set to the curvature of the rounded corner of the bucket claw tip, taking into account, for example, a substantial limit for the construction accuracy of the hydraulic excavator. The curvature 1/R (maximum) in this case can be associated with the operation amount (substantially minimum arm operation amount) at which an operation of the arm cylinder 6 is started when an arm operation is inputted to the operation lever device 1*d*. As another example, the maximum of the curvature 1/R can be determined according to the accuracy required in the actual construction site. As an operation amount associated with the operation amount where the curvature 1/R becomes maximum, an operation amount when a general operator performs a final finish construction (however, it is to be noted that the operation amount is larger than the operation amount at which the arm cylinder 6 starts operating) may be adopted.

The minimum of the curvature 1/R of the supplemented design face S1 can be set, for example, to the inverse of the maximum length from the rotational axis of the arm 12 to the claw tip of the bucket 8. Normally, in an operation plane of the front work device 15, the distance from the rotational axis of the arm 12 to the claw tip of the bucket 8 becomes maximum when the bucket claw tip is located on a straight line passing through the rotational axis of the arm 12 and the rotational axis of the bucket 8. In this instance, the radius R of the supplemented design face S1 coincides with the maximum length from the rotational axis of the arm 12 to the claw tip of the bucket 8, and the arcuated supplemented design face S1 can be traced by only an operation of the arm 12. Therefore, even if a variation is generated in the boom command velocity, the bucket 8 can be prevented from entering below the two design faces. The curvature 1/R (minimum) in this case can be associated with the maximum of the operation amount (full operation) which can be inputted to the operation lever device 1*d* at the time of an operation of the arm 12.

Note that, when the minimum of the curvature 1/R is determined in this way, there may be a case where the end points of the circular arc cannot be located on the two design faces adjacent to each other, depending on the size of the supplemented design face S1. In that case, the radius of such a circular arc that is limited on the two design faces adjacent to each other can be used as the maximum of R. In addition, as depicted in FIG. 5(*c*), the supplemented design face S1 can also be generated such that an end point (in the example of the figure, the end point P2') of the circular arc is located on another design face (in the example of the figure, the design face P0P1) located next to either one (in the example of the figure, the design face P1P2) of the two design faces P1P2 and P2P3 adjacent to each other.

As for the maximum and the minimum of the curvature 1/R, a configuration in which the operator can set the maximum and the minimum to optional values, other than the above-exemplified values, may also be adopted.

Based on the aforementioned contents, the relation of the curvature 1/R of the supplemented design face S1 relative to the arm operation amount inputted to the operation lever operation 1*d* can be a monotonous decrease relation. In other words, a relation in which the curvature 1/R of the supplemented design face S1 always decreases as the arm operation amount increases can be established. Note that, when the curvature 1/R is rephrased as the radius R, a monotonous increase relation in which the radius R of the supplemented design face S1 always increases as the arm operation amount increases can be established.

Note that, when the arm operation amount for the operation lever device 1*d* is small to such an extent that the operation of the arm cylinder 6 does not start (namely, when the operation amount for the operation lever device 1*d* is less than the operation amount for the arm cylinder 6 to start operating), the supplemented design face generating section 140 may stop generation of the supplemented design face S1.

(Approximation of Supplemented Design Face S1 by Plurality of Planes (Line Segments))

While the processing of the supplemented design face generating section 140 may be finished by generating the curved surface-shaped (curved line-shaped (more specifically, the circular arc P2'P2.1)) supplemented design face S1 as described above, in the present embodiment, the supplemented design face generating section 140 approximates the curved surface-shaped supplemented design face S1 by a plurality of planes (line segments) to generate a supplemented design face S2.

In view of this, as depicted in FIG. 5(*d*), the supplemented design face generating section 140 obtains a face (approximated supplemented face) by approximating and dividing the circular arc P2'P2.1 of FIG. 5(*b*) into n faces as the supplemented design face S2, and calculates supplemented design face data including n design faces (planes) of the face P2'P2.1, the face P2.1P2.2, . . . , the face P2.*n*-1P2.*n*. The supplemented design face data includes inclination angle information concerning each plane. The number of division of the circular arc can be determined according to survey accuracy, survey interval, and the like. As an example, in such an environment that survey point data is acquired at an interval of 10 cm, such an "n" as to divide the circular arc by line segments of a length on the order of 10 cm can be set.

When the face obtained by supplementing the curved surface-shaped supplemented design face S1 with a plurality of planes is made to be a new supplemented design face S2, for example, the calculation of the distance (difference data) between the bucket claw tip (working point) and each plane which is calculated by a difference calculation section 110 described later is simplified, and the calculation load of the controller 500 on the curved surface-shaped supplemented design face S1 is reduced.

(Difference Calculation Section 110)

The difference calculation section 110 calculates distances (differences) between the claw tip of the bucket 8 and the planes constituting the supplemented design face S2, from the position of the claw tip of the bucket 8 calculated from posture data and size data and the supplemented design face data from the supplemented design face generating section 140, and outputs the distances as difference data. In the difference data, the distances (differences) between the two design faces P1P2 and P2P3 serving as sources for generating the supplemented design face S2 and the bucket claw tip may be calculated and included, or the differences of other design faces may be calculated and included.

(Target Face Setting Section 150)

The target face setting section 150 sets a target face (control object face for semi-automatic excavation control) on any one of a plurality of design faces prescribed on the operation plane of the front work device 15, inclusive of the supplemented design face generated by the supplemented design face generating section 140, and outputs information concerning the target face (for example, position data concerning the target face) as target face data. The target face setting section 150 in the present embodiment selects the smallest distance (difference) among the difference data from the difference calculation section 110, and outputs both the thus selected difference data and information on the face (target face) concerning the selected difference data together as target face data. More specifically, the target face setting section 150 sets the surface for which the distance from the bucket claw tip (working point) is the smallest among the plurality of planes constituting the supplemented design face S2 as a target face, based on the difference data outputted from the difference calculation section 110, and outputs target face data concerning the target face.

Note that, while the target face has been set according to the magnitude of the difference data (the distance between each plane and the working point) in the present embodiment, the target face may be set according to the magnitude of the target velocity to be generated in the hydraulic cylinder by semi-automatic excavation control, like one of the embodiments of Patent Document 1. In the case of the present embodiment, specifically, the plane for which the target velocity of the boom cylinder 5 (target velocity in the boom raising direction) by semi-automatic excavation control becomes the largest, among the plurality of planes constituting the supplemented design face S2, may be set as the target face.

(Target Velocity Calculation Section 120)

The target velocity calculation section 120 calculates a target velocity of the working point (bucket claw tip) such that the moving range of the working point (bucket claw tip) set on the work device is maintained on the target face or above the target face, based on the posture data, the size data, the operation amount data, and the target face data (position data on the target face), and outputs the target velocity as target velocity data. As a specific example of the calculating method for the target velocity, there is a method in which a component of the target velocity in a direction along the target face is determined based on the arm operation amount and a component of the target velocity in a direction perpendicular to the target face is determined based on the difference (distance) between the bucket claw tip and the target face. As another method different from this method, there is a method in which, while the arm 12 is being moved according to the operation amount, the target velocity such that the velocity of the bucket claw tip in a direction perpendicular to the target face becomes a value based on the difference between the bucket claw tip and the target face is determined.

(Actuator Velocity Calculation Section 130)

The actuator velocity calculation section 130 computes the target velocities of the boom cylinder 5, the arm cylinder 6, and the bucket cylinder 7 (target actuator velocities) necessary for generating the target velocity at the bucket claw tip by kinematical calculations, from the target velocity which is the velocity of the working point (bucket claw tip) based on the size data, the posture data, and the target velocity data. The target velocities of the boom cylinder 5, the arm cylinder 6, and the bucket cylinder 7 are referred to also as a boom velocity, an arm velocity, and a bucket velocity, respectively (see FIG. 4).

(Flow Chart of Processing of Main Controller 500)

Figure 8:
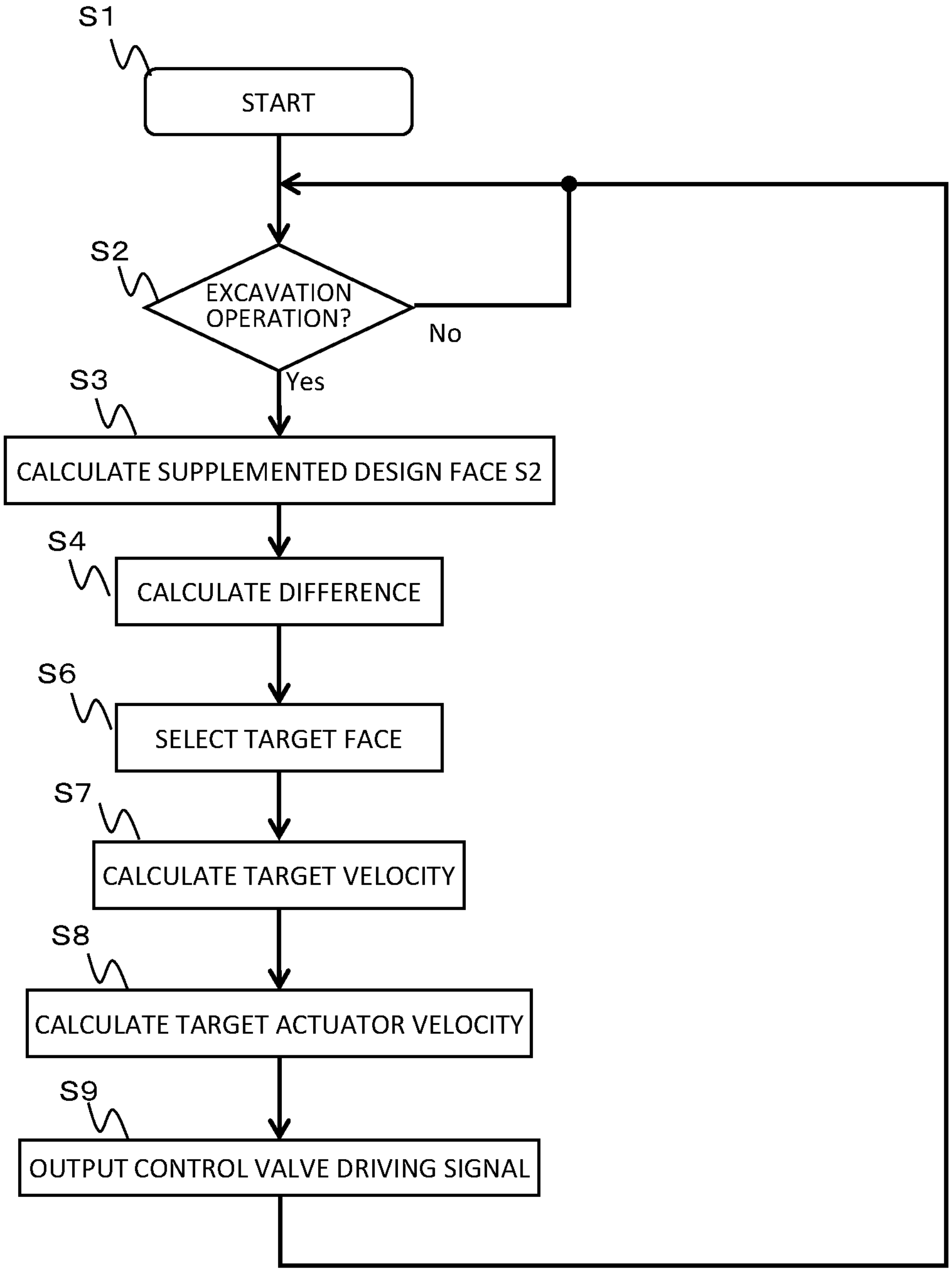
FIG. 8 is a flow chart depicting a flow of control in the first embodiment.

FIG. 8 is a flow chart of processing executed by the main controller 500, which depicts the flow of the aforementioned calculations. While each processing (steps S1 to S9) may be described with each section in the main controller 500 depicted in FIG. 4 as a subject hereinafter, the hardware that executes each processing is the main controller 500.

First, the information processing section 100 proceeds the processing to step S3 if an arm operation (excavation operation) by the operation lever 1*d* is detected based on the operation amount data (steps S1 and S2). If the arm operation is not detected in step S2, step S2 is repeated until the arm operation is detected.

In step S3, the supplemented design face generating section 140 generates the supplemented design face S2 (see FIG. 5(*d*)) consisting of a plurality of planes above the junction between the two design faces having different angles (the design face P1P2 and the design face P2P3 in the example of FIG. 5) based on the aforementioned method using the data on the operation amount for the arm 12 by the operation lever device 1*d* (operation amount data) and design face data from the design face setting device 18, and outputs the supplemented design face data including the position information and inclination angle information concerning each of the planes included in the generated supplemented design face S2 to the target face setting section 150.

In step S4, the difference calculation section 110 calculates the position of the bucket claw tip (working point) by use of size data on the front work device 15 and posture data on each of the front members 11, 12, and 8, and calculates the differences (distances) between the respective planes included in the supplemented design face S2 and the bucket claw tip. Then, the difference calculation section 110 outputs the calculated differences to the target face setting section 150 as difference data.

In step S6, the target face setting section 150 compares the plurality of differences calculated in step S4 with one another, selects the smallest difference among the differences, and sets the plane concerning the selected difference as a target face which is the control object of semi-automatic excavation control. Then, the target face setting section 150 outputs the position information of the set target face, the inclination angle information of the set target face, and the information on the difference between the set target face and the bucket claw tip together as target face data to the target velocity calculation section 120.

In step S7, the target velocity calculation section 120, from the difference (distance) between the target face and the bucket claw tip included in the target face data from the target face setting section 150 and the operation amounts of the operation lever devices 1*c* and 1*d*, calculates a target velocity to be generated at the bucket claw tip for moving the bucket claw tip along the target face. Then, the target velocity calculation section 120 outputs the target velocity as target velocity data to the actuator velocity calculation section 130. Here, (1) a velocity component of the target velocity in a direction along the target face (horizontal velocity component) is computed based on the arm operation amount included in the operation amount data, (2) a velocity component of the target velocity in a direction perpendicular to the target face (perpendicular velocity component) is computed based on the difference (distance) between the bucket claw tip and the target face included in the target face data, and (3) the two velocity components calculated in (1) and (2) above are added to each other to obtain the target velocity. Note that the relation between the difference and the perpendicular velocity component is preset such that the perpendicular velocity component is also zero when the difference is zero and that the perpendicular velocity component (it is to be noted that the perpendicular velocity component has a downward direction) also increases as the difference increases. When the target velocity is calculated in this way, the moving range of the bucket claw tip is maintained on the target face or above the target face. Particularly when the bucket claw tip is located on the target face (when the difference is zero), the perpendicular velocity component is kept zero and only the horizontal velocity component is present, for example, the bucket claw tip can be moved along the target face by only operating the arm.

In step S8, the actuator velocity calculation section 130, from the target velocity from the target velocity calculation section 120 and the size data and the posture data, computes the respective target velocities of the boom cylinder 5, the arm cylinder 6, and the bucket cylinder 7 (target actuator velocities) necessary for generating the target velocity calculated in step S7 at the bucket claw tip, and outputs the target actuator velocities to the control valve driving section 200 (step S8). When the target velocity of the arm cylinder 6 is determined according to the arm operation amount and it is assumed that the bucket operation in that instance is absent (in other words, the target velocity of the bucket cylinder 7 is zero), only the boom cylinder 5 is automatically operated under the semi-automatic excavation control.

The control valve driving section 200 calculates a control valve driving signal based on the target actuator velocities calculated in step S8 such that the cylinders 5, 6, and 7 are actually operated at the target actuator velocities, and outputs the control valve driving signal. In this way, by the control valve driving signal, the control valve 20 is driven, and the machine body is operated.

(Operations and Effects)

In the hydraulic excavator according to the present embodiment configured as above, at the time of construction of a plurality of design faces prescribed on the operation plane of the front work device 15, a supplemented design face S2 connecting smoothly the two design faces is generated above the two design faces, by n planes whose inclination angles vary gradually along the bucket passing direction when the bucket 8 passes through the junction of the two design faces. The curvature of the supplemented design face S2 (in other words, the ratio of variations in the inclination angles of the n planes) is determined according to the arm operation amounts by the operator at the time of generating the supplemented design face S2. As a result, when the bucket 8 passes through the junction of the two design faces, semi-automatic excavation control is conducted with one of the n planes whose inclination angles vary gradually along the bucket passing direction as a target face. As a result, the bucket 8 does not enter either of the two design faces, regardless of the magnitude of the operator's operation amount, and excavation forming work can be performed without impairing workability.

Figure 6:
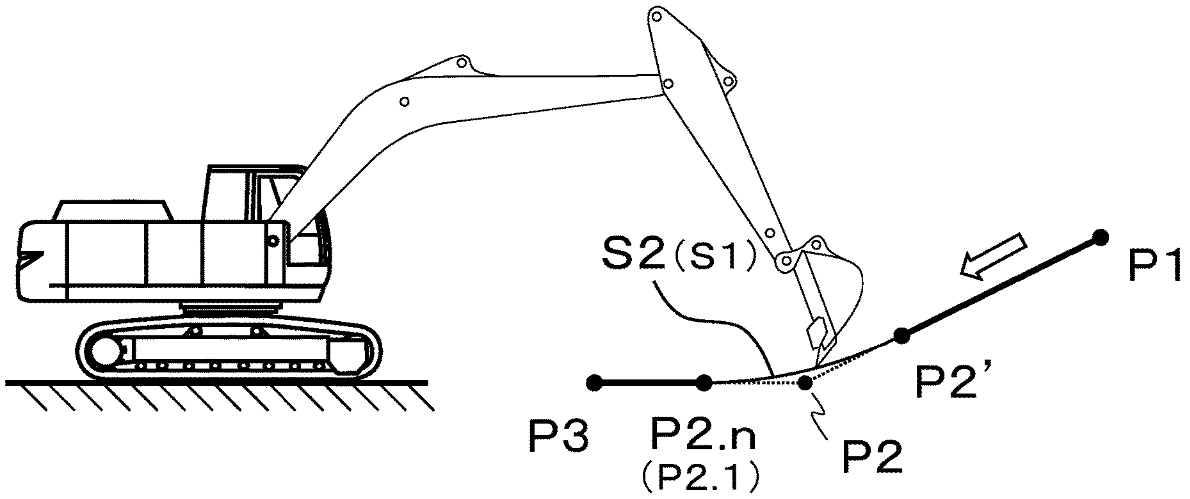
FIG. 6 is a diagram depicting the work machine that excavates along a supplemented design face.
Figure 7:
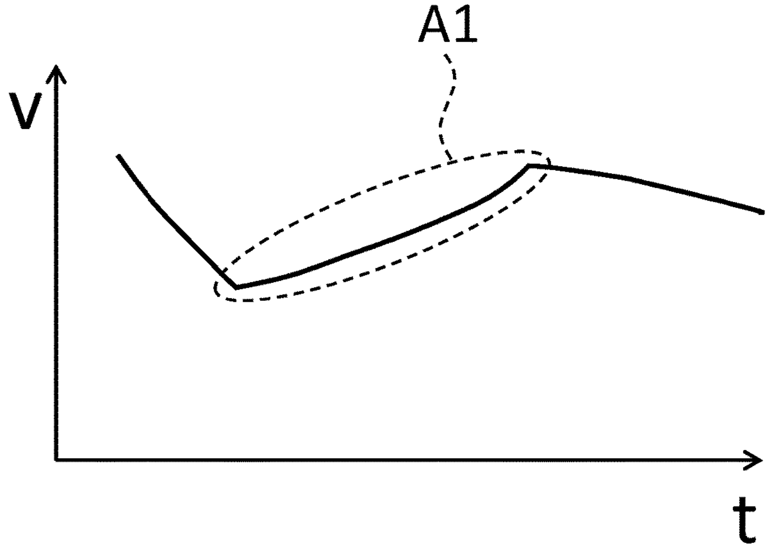
FIG. 7 is a diagram indicating a velocity generated in a boom cylinder of the work machine that excavates along the supplemented design face.
Figure 13:
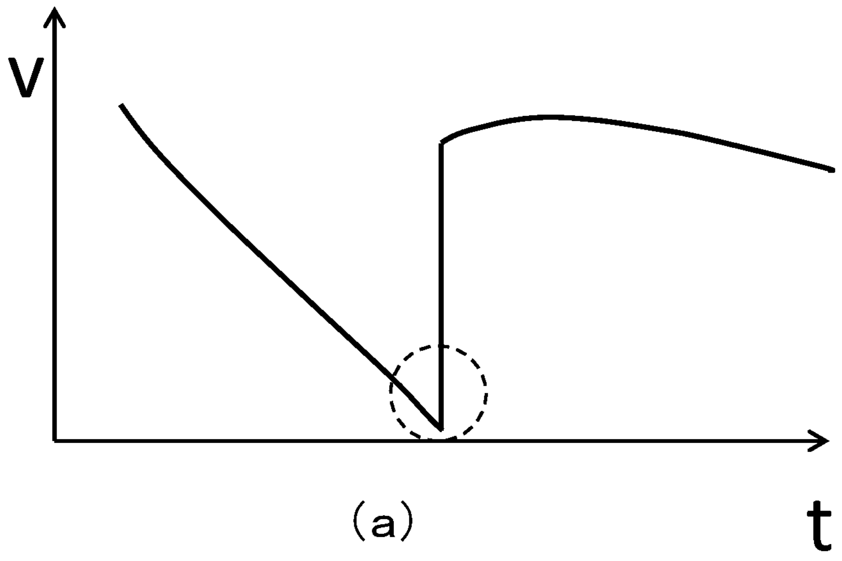
FIG. 13 is a diagram indicating a velocity generated in a boom cylinder of a work machine in the prior art in performing construction depicted in FIG. 11.
Figure 13:
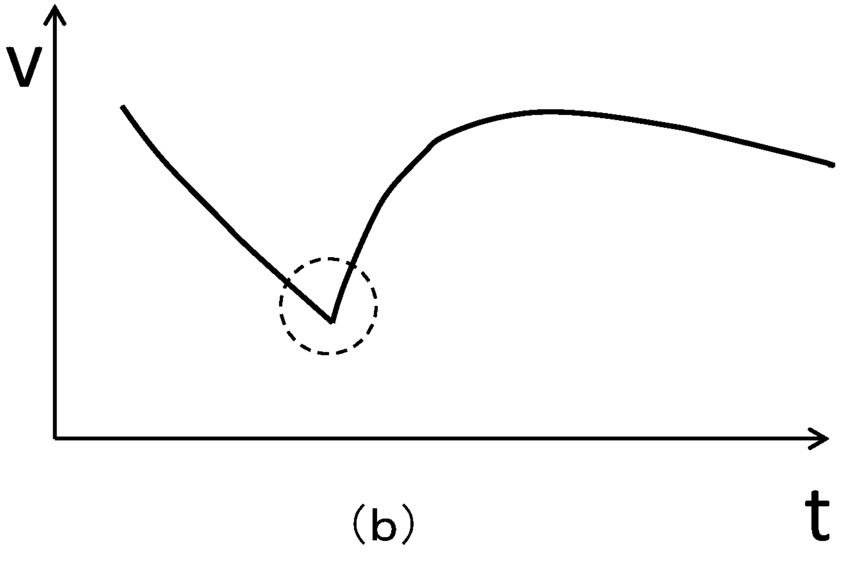

For example, when construction of design faces is performed by moving the bucket 8 in a direction of an arrow in FIG. 6 with the line segment P1P2 and the line segment P2P3 in FIG. 6 as two design faces, the supplemented design face S2 (see also FIG. 5(*d*)) is generated on the two design faces. As a result, the hydraulic excavator is operated with the line segment P1P2', the supplemented design face S2, and the line segment P2.*n*P3 as design faces. In this instance, a command velocity (boom cylinder target velocity) generated at the boom 11 by semi-automatic excavation control varies with the lapse of time as depicted in FIG. 7. The variation in the boom command velocity in the process of transition of the bucket 8 from the line segment P1P2 to the line segment P2P3 corresponds to part A1 surrounded by a dotted line in FIG. 7. The supplemented design face S2 consists of a plurality of planes whose inclination angles vary gradually along the arrow in the figure, so that variation in the boom command velocity when the target face is changed over can be restrained, and the variation is extremely gentle variation as compared to the variation in the boom command velocity in the prior art depicted in FIGS. 13(*a*) and 13(*b*). In addition, since the curvature of the supplemented design face S2 decreases as the arm operation amount increases, the bucket 8 can be prevented from entering the design faces due to a delay of an operation of the boom 11, even if the arm operation amount is large. In other words, according to the present embodiment, both construction accuracy and working speed can be secured.

In addition, when finally finishing the design faces in an actual construction, the operator generally sets the arm operation amount sufficiently small; therefore, the curvature of the generated supplemented design face becomes sufficiently large and the supplemented design face approaches the original two design faces (for example, approach the curvature of the rounded corner of the bucket claw tip), so that a highly accurate excavation work along the two design faces can be achieved. Note that, in this case, since the arm operation amount is sufficiently small, the variation in the boom command velocity is also small, and the bucket 8 does not enter the design face due to a delay of an operation of the boom 11.

Second Embodiment

Next, a second embodiment will be described. Note that the parts in common with the first embodiment will be omitted from description, as required.

Figure 9:
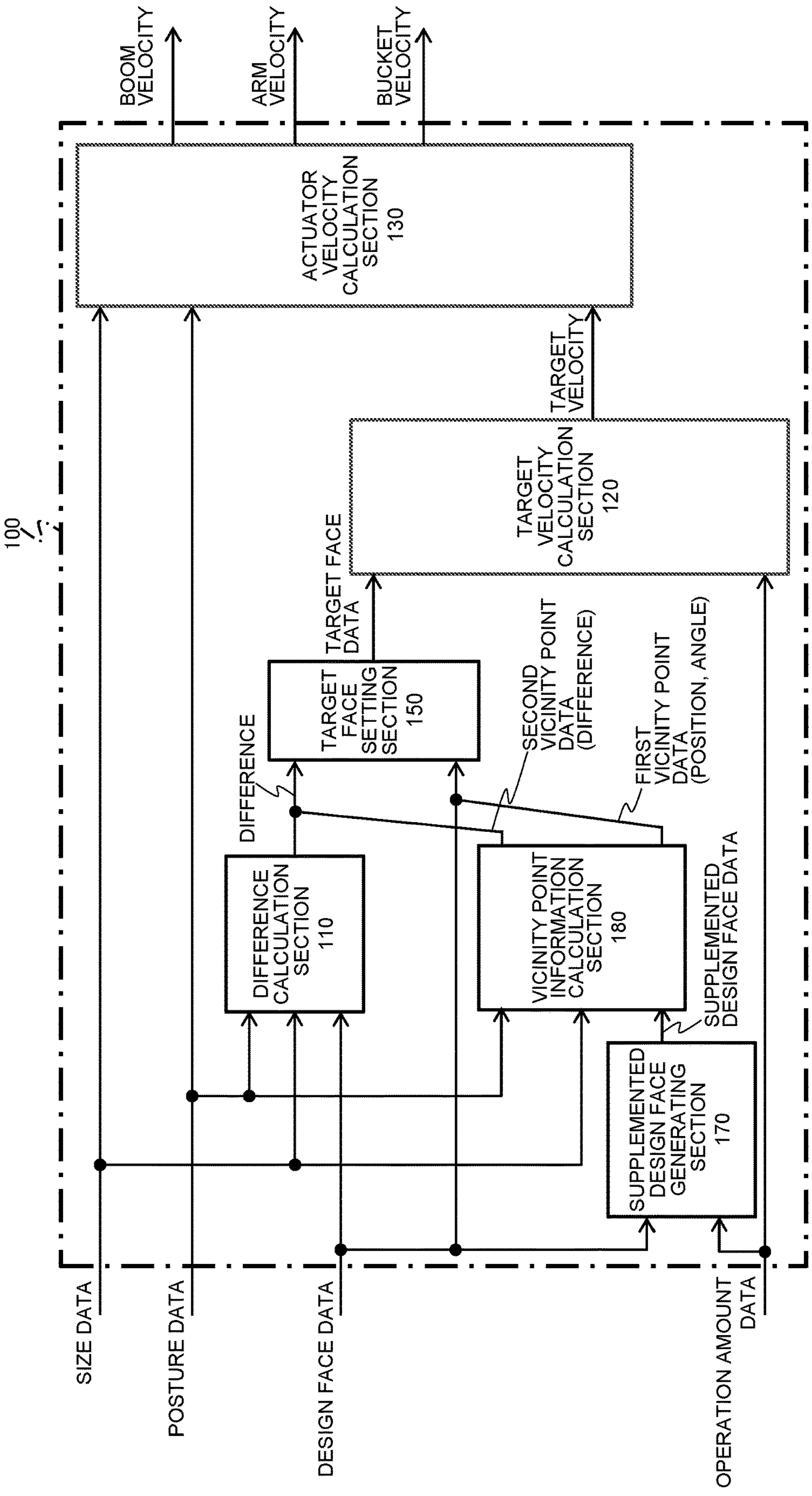
FIG. 9 is a block diagram depicting a detailed configuration of the information processing section depicted in FIG. 3 in the second embodiment.

A control system of the second embodiment will be described with reference to FIG. 9.

In the second embodiment, a difference calculation section 110 calculates differences between a plurality of design faces included in design face data and the bucket claw tip (working point), from design face data, posture data, and size data, and outputs the differences. Note that the design faces for which the differences are to be calculated may be limited to those which are present within a predetermined range from the bucket claw tip (working point).

(Supplemented Design Face Generating Section 170)

The supplemented design face generating section 170 generates an arcuate (curved surface-shaped) supplemented design face S1 (see FIG. 5(*b*)) from design face data and operation amount data, in the manner similar to the supplemented design face generating section 140 in the first embodiment, and outputs information concerning the position and shape of the supplemented design face S1 as supplemented design face data.

(Vicinity Point Information Calculation Section 180)

The vicinity point information calculation section 180 calculates the position of the bucket claw tip (working point) from size data and posture data, and, calculates a point on the arcuate supplemented design face S1 which is the closest to the bucket claw tip as a vicinity point by using the supplemented design face data. The vicinity point information calculation section 180 outputs the position and angle of the vicinity point (an angle of a tangent at the vicinity point) as first vicinity point data (inclusive of the position and the angle), and outputs the difference between the bucket claw tip and the vicinity point as second vicinity point data (inclusive of the difference). Note that the first vicinity point data and the second vicinity point data may together be referred to generically as vicinity point data.

(Target Face Setting Section 150)

The target face setting section 150 selects the smallest difference, among the differences of the two design faces on which both ends of the supplemented design face S1 are located, of the difference data inputted from the difference calculation section 110, and the difference of the vicinity point included in the second vicinity point data inputted from the vicinity point information calculation section 180, and sets the design face or the tangent of the vicinity point according to the selected difference as a target face. In addition, the target face setting section 150 selects, among the design face data and the first vicinity point data (the position and the angle), the data according to the target face as the position and angle of the target face. The target face setting section 150 outputs the difference, the position, and the angle of the selected target face to the target velocity calculation section 120 as target face data.

The other parts are similar to those in the first embodiment.

(Flow Chart of Processing of Main Controller 500)

Figure 10:
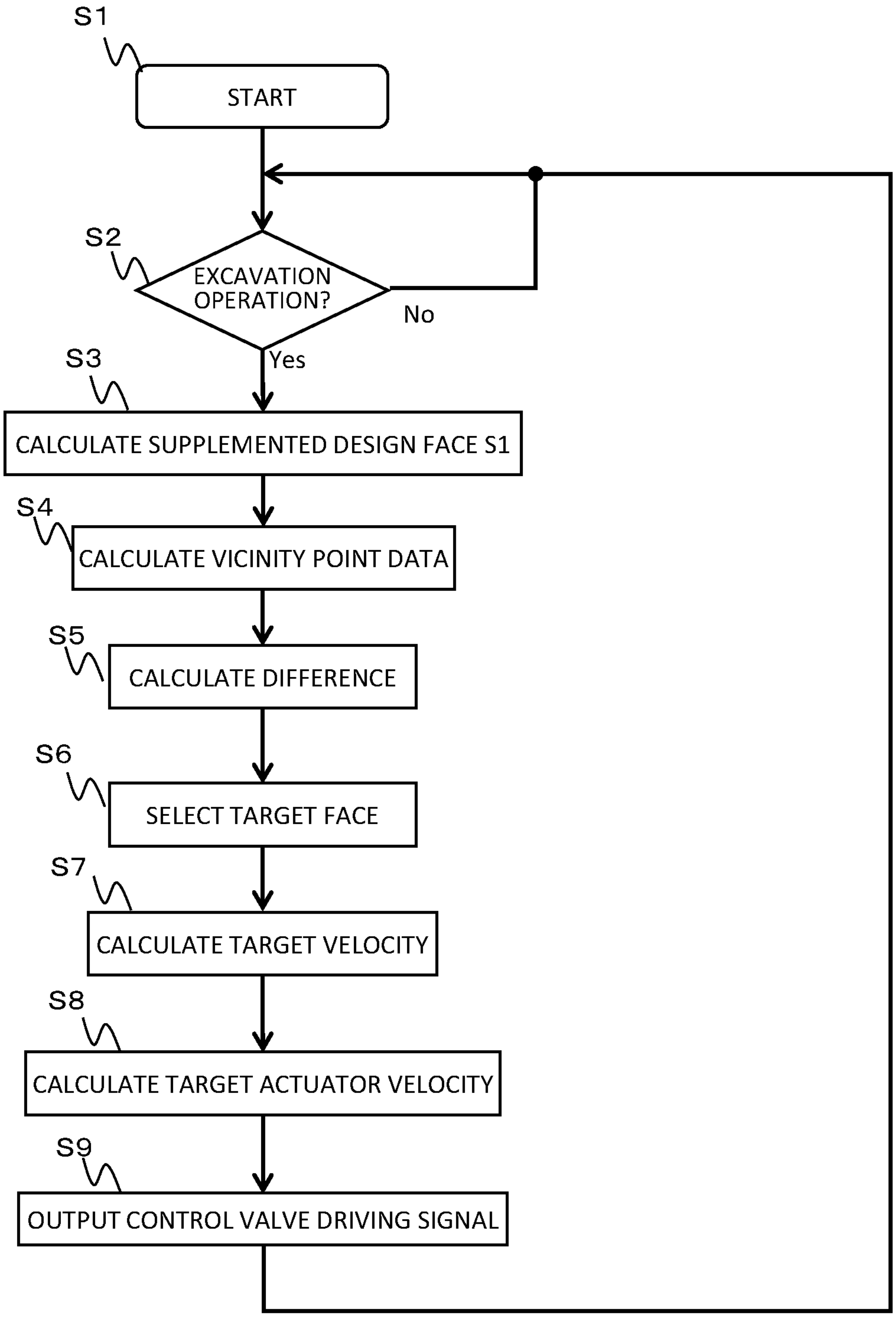
FIG. 10 is a flow chart depicting a flow of control in the second embodiment.

FIG. 10 is a flow chart depicting a flow of processing of the main controller 500, inclusive of the aforementioned calculations.

The information processing section 100 starts processing when the operation levers 1*c* and 1*d* are operated (steps S1 and S2).

The supplemented design face generating section 170 calculates supplemented design face data by use of operation amount data and design face data (step S3).

The vicinity point information calculation section 180 calculates a position of the bucket claw tip by use of size data and posture data, and calculates a position of the vicinity point that is the closest point to the bucket tip on the curved surface included in the supplemented design face data, an angle of the vicinity point (angle of a tangent at the vicinity point), and a difference (distance) between the vicinity point and the bucket claw tip, and outputs these as vicinity point data (first vicinity point data and second vicinity point data) (step S4).

The difference calculation section 110 calculates a position of the bucket claw tip by use of size data and posture data, and calculates the respective differences (distances) between a plurality of design faces included in the design face data and the bucket claw tip (step S5).

The target face setting section 150 compares the differences of the two design faces on which both ends of the supplemented design face S1 are located, of the differences inputted from the difference calculation section 110, and the second vicinity point data (difference) inputted from the vicinity point information calculation section 180 with one another, and sets the design face or the tangent at the vicinity point according to the smallest difference as a target face (control object of semi-automatic excavation control). Further, the target face setting section 150 selects, among the design face data and vicinity point data (the position and the angle), the data according to the target face, and outputs the data together with the difference of the target face as target face data (step S6).

The target velocity calculation section 120 calculates a target velocity for the bucket claw tip from the position, the angle, and the difference of the target face, and the operation amount (step S7).

The actuator velocity calculation section 130 computes the respective target velocities of the boom cylinder 5, the arm cylinder 6, and the bucket cylinder 7 (target actuator velocities) necessary for generating the target velocity calculated in step 7 at the bucket claw tip, from the target velocity calculated in step S7, size data, and posture data (step S8).

The control valve driving section 200 outputs a control valve driving signal based on the target actuator velocities calculated in step S8 such that the cylinders 5, 6, and 7 are actually operated at the target actuator velocities (step S9).

(Effects)

In the present embodiment, it is necessary to determine the distance (difference) between a point (vicinity point) on the circular arc (supplemented design face S1 (see FIG. 5(*b*))) varying moment by moment with the movement of the bucket claw tip and the bucket claw tip. Thus, calculation is complicated as compared to the first embodiment. However, since the arcuate supplemented design face S1 is not approximated by a straight line, a smoother bucket operation is possible.

Third Embodiment

Next, a third embodiment will be described. Note that the parts in common with the first embodiment will be omitted from description, as required.

Figure 11:
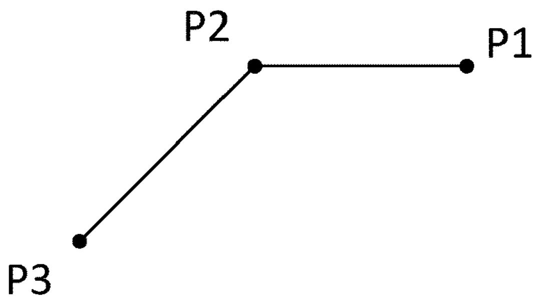
FIG. 11 is a diagram depicting a supplementing method for a design face junction in the third embodiment.
Figure 11:
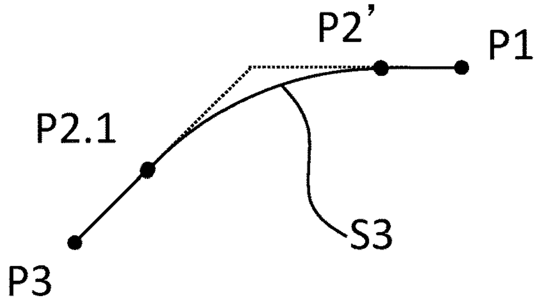
Figure 11:
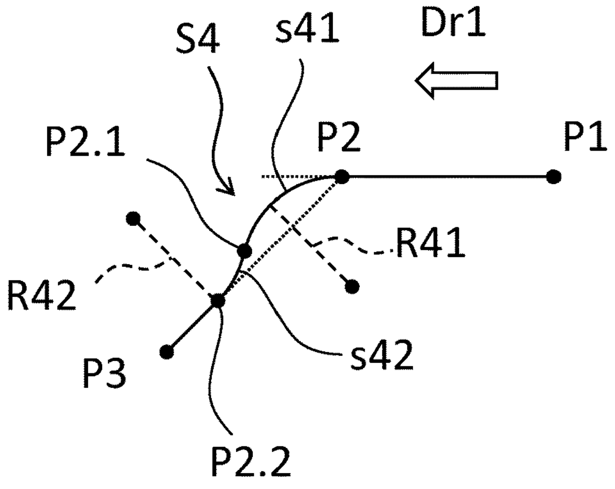
Figure 12:
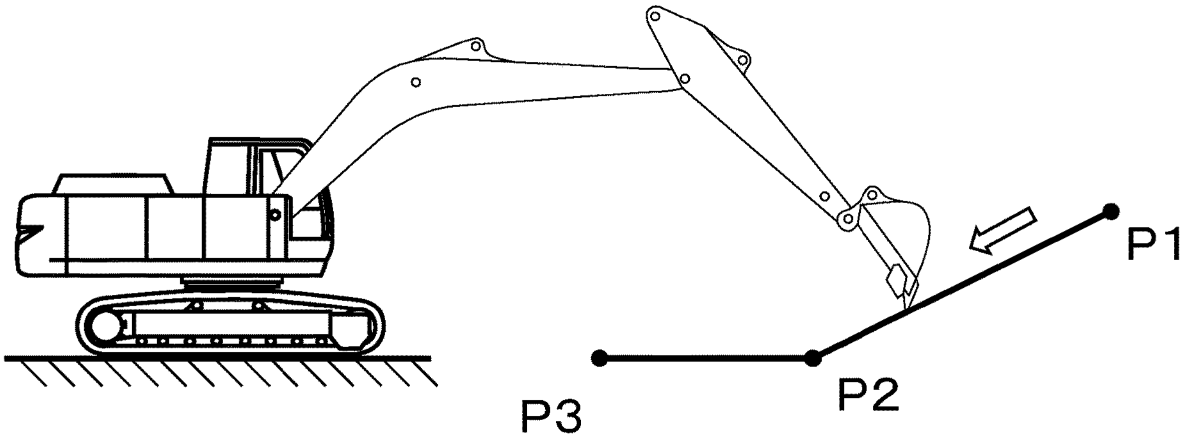
FIG. 12 is a diagram depicting a work machine that performs construction based on design data including a plurality of design faces in the prior art.

In the first embodiment, in a case where an upwardly protruding face (top of slope) is formed at the junction P2 between the two design faces P1P2 and P2P3 as depicted in FIG. 11(*a*), if the supplemented design face generating section 140 generates a supplemented design face S3 as depicted in FIG. 11(*b*) below the two design faces P1P2 and P2P3, the bucket 8 would enter below the two design faces P1P2 and P2P3 in the vicinity of the junction P2 when excavation work is conducted along the supplemented design face S3.

To prevent this, a method may be considered in which generation of the supplemented design face by the supplemented design face generating section 140, inclusive of the supplemented design face S3, is stopped at all for the two design faces P1P2 and P2P3 forming the upwardly protruding face, and excavation is conducted for the original two design faces P1P2 and P2P3.

The supplemented design face generating section 140 in the present embodiment generates a supplemented design face S4, as a method other than the above-mentioned method.

In other words, when the shape of the junction P2 between the two design faces P1P2 and P2P3 is upwardly protruding and the bucket claw tip (working point) is moved from one side (the right side (first direction) in the figure) toward the other side (the left side (second direction) in the figure) as indicated by an arrow in the figure in the front-rear direction of the hydraulic excavator on the operation plane of the front work device 15, as depicted in FIG. 11(*c*), the supplemented design face generating section 140 generates as the supplemented design face S4 a face having a first arcuate surface s41 and a second arcuate surface s42. The first arcuate surface s41 has one end connected to an end portion of the design face P1P2 on the one side of the two design faces P1P2 and P2P3 at the same inclination as that of the design face P1P2 on the one side. The second arcuate surface s42 has one end connected to the other end side of the first arcuate surface s41 and other end connected to the design face P2P3 on the other side of the two design faces P1P2 and P2P3 at the same inclination as that of the design face P2P3 on the other side. The supplemented design face S4 in this case has an end portion on one side thereof located at the junction P2.

The radii R41 and R42 of the two arcuate surfaces s41 and s42 illustrated are the same, and the magnitudes of the curvatures (1/R41 and 1/R42) can be determined in the same manner as in the first embodiment. The arcuate surface s41 is in an upwardly protruding shape, and the arcuate surface s42 is in a downwardly protruding shape. It is preferable that the inclinations of the two arcuate surfaces s41 and s42 at the point P2.1 which is the junction between the two arcuate surfaces s41 and s42 coincide with each other. Note that the radii R (curvatures 1/R) of the two arcuate surfaces s41 and s42 may not necessarily coincide with each other. In addition, the two arcuate surfaces s41 and s42 may not be connected to each other at one point, but may be connected through a line segment or a curved line. At this time, it is preferable that the inclinations of the connected parts of the arcuate surfaces s41 and s42 and the inclinations of the line segment or curved line are all coincident.

The other parts are similar to those in the first embodiment. Alternatively, the other parts may be configured similarly to those in the second embodiment.

In a case where the two design faces form an upwardly protruding shape (the two design faces form a top of slope) as in the present embodiment, if the supplemented design face P4 as depicted in FIG. 11(*c*) is generated in the supplemented design face generating section 140, it is ensured that, when the bucket 8 passes through the junction of the two design faces, excavation forming work can be performed without the bucket 8 entering into either of the two design faces, irrespective of the operator's operation amount, and without impairing workability.

<Others>

Note that, while the supplemented design faces R1 and R2 is generated as circular arcs with a constant curvature 1/R in the first and second embodiments, the curvature 1/R may be changed according to the position on the supplemented design faces. The examples are depicted in FIG. 14.

Figure 14:
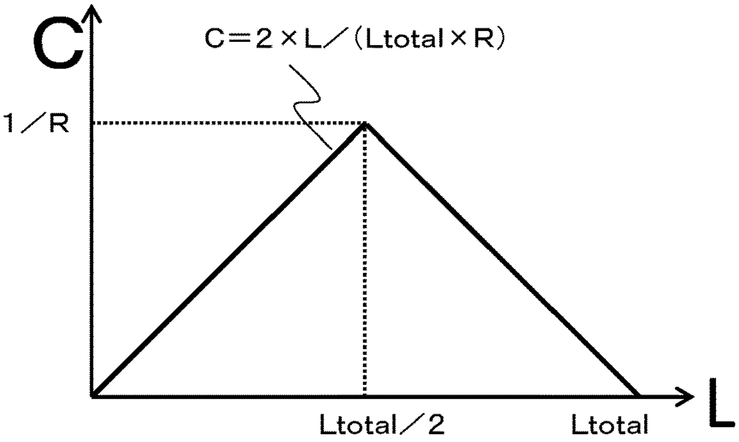
FIG. 14 is a diagram depicting examples of a relation formula between a curved line length and a curvature of a supplemented face.
Figure 14:
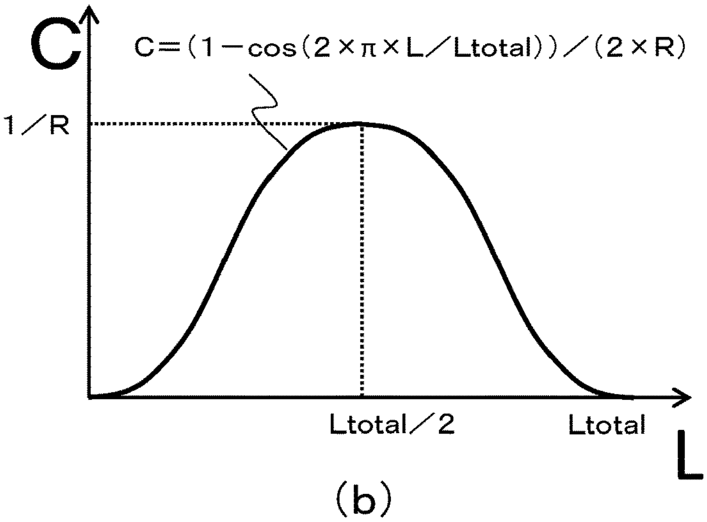
Figure 14:
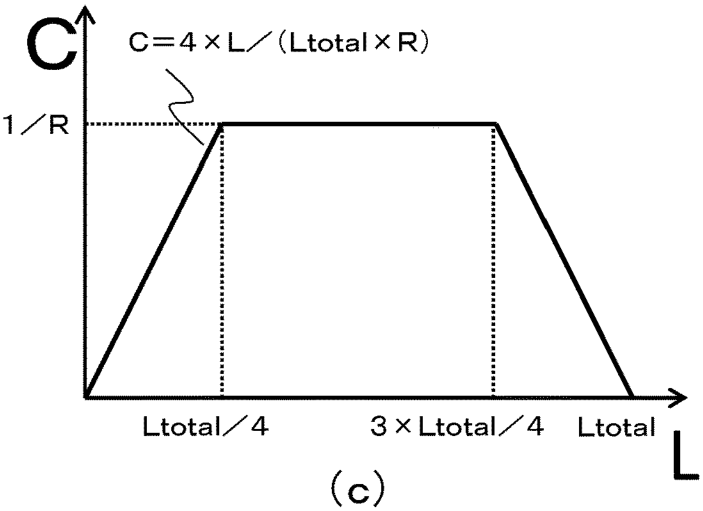

FIG. 14 depicts examples of the relational formula between the position L and the curvature C on a supplemented design face. The reference (L=0) of the position L on the supplemented design face with a total length of Ltotal is set to be an end point (reference point) on one side of the supplemented design face, and the maximum of the curvature C of the supplemented design face is made to be 1/R based on the radius of the circular arc.

In the example of FIG. 14(*a*), the curvature C is linearly increased from an end point on one side to a midpoint of the supplemented design face, and, thereafter, the curvature C is decreased at the same ratio from the midpoint to an end point on the other side.

In the example of FIG. 14(*b*), the curvature C is increased in the manner of a curved line such as a sine wave or a cosine wave according to the position on the supplemented design face. The curvature is minimum at both ends of the supplemented design face, and reaches a maximum (1/R) at a midpoint.

In addition, as depicted in FIG. 14(*c*), the curvature C may be varied (increased) from an end point (reference point) on one side of the supplemented design face to a first distance (for example, L=Ltotal/4), thereafter, the curvature C may be maintained constant (1/R) from the first distance to a second distance (for example, L=Ltotal×¾), and finally, the curvature C may again be varied (decreased) from the second distance to an end point (L=Ltotal) on the other side.

When the curvature C is thus set on the basis of position on the supplemented design face, the calculation for generating the supplemented design face in the supplemented design face generating section 140 and 170 is complicated, but the operation of the front work device 15 at the time of semi-automatic excavation control becomes smoother. Note that, in the third embodiment, also, the curvature may be changed similarly.

Note that the present invention is not limited to the above-described embodiments, but includes various modifications within a range not departing from the gist thereof. For example, the present invention is not limited to the one that includes all the configurations described in the above embodiments, but includes those in which a part of the configurations is deleted. In addition, a part of the configuration according to a certain embodiment may be added to or replaced by the configuration according to other embodiment.

Besides, the configurations according to the controller 500 described above, the functions, execution processing and the like of the configurations may partly or entirely be realized by hardware (for example, by designing a logic for performing each function in the form of an integrated circuit). In addition, the configuration according to the controller 500 may be a program (software) which is read and executed by an arithmetic processing device (for example, CPU) to realize each function according to the configuration of the controller 500. The information concerning the program can be stored, for example, in a semiconductor memory (flash memory, SSD, and the like), a magnetic storage device (hard disc drive, and the like), a recording medium (magnetic disc, optical disc, and the like), and the like.

In addition, while control lines and information lines which are necessary for explaining the embodiment have been indicated in the description of each of the above embodiments, not all the control lines and information lines concerning the product are necessarily described. It can be considered that, in practice, substantially all the configurations are connected to one another.

DESCRIPTION OF REFERENCE CHARACTERS

1*a*: Track right operation lever
1*b*: Track left operation lever

1*c*: Right operation lever
1*d*: Left operation lever
2: Hydraulic pump device
2*a*: First pump
2*b*: Second pump
3*a*: Right track hydraulic motor
3*b*: Left track hydraulic motor
4: Swing hydraulic motor
5: Boom cylinder (hydraulic actuator)
6: Arm cylinder (hydraulic actuator)
7: Bucket cylinder (hydraulic actuator)
8: Bucket (front member)
9: Lower track structure (machine body)
10: Upper swing structure (machine body)
11: Boom (front member)
12: Arm (front member)
13*a*: Posture sensor
13*b*: Posture sensor
13*c*: Posture sensor
13*d*: Machine body posture sensor (posture sensor)
14: Engine
15: Front work device
18: Design face setting device
19: Machine body information storage device
20: Control valve
21: Bucket directional control valve
21*a*: Bucket crowding solenoid valve
21*b*: Bucket dumping solenoid valve
22: Boom directional control valve
22*a*: Boom raising solenoid valve
22*b*: Boom lowering solenoid valve
23: Arm directional control valve
23*a*: Arm crowding solenoid valve
23*b*: Arm dumping solenoid valve
26: Relief valve
27: Relief valve
100: Information processing section
110: Difference calculation section
120: Target velocity calculation section
130: Actuator velocity calculation section
140: Supplemented design face generating section
150: Target face setting section
170: Supplemented design face generating section
180: Vicinity point information calculation section
500: Main controller

The invention claimed is:

1. A work machine comprising:
a work device;
a plurality of actuators that drive the work device;
an operation device that operates the plurality of actuators; and
a controller that controls driving of at least one of the plurality of actuators,
wherein the controller is configured to
generate a supplemented design face that passes through a junction or above the junction between a first design face and a second design face adjacent to each other among a plurality of design faces prescribed on an operation plane of the work device, the supplemented design face having one end thereof positioned on the first design face and another end thereof positioned on the second design face,
set a curvature of the supplemented design face according to an operation amount of the operation device,
set a target face on the supplemented design face, and
execute semi-automatic excavation control to control at least one of the plurality of actuators such that a working point set on the work deice is maintained on the target face or above the target face.

2. The work machine according to claim 1,
wherein the controller is configured to
approximate the supplemented design face by a plurality of planes, and
execute the semi-automatic excavation control by setting one of the plurality of planes as the target face.

3. The work machine according to claim 1,
wherein the controller is configured to set the curvature of the supplemented design face such that a relation of the curvature of the supplemented design face relative to the operation amount of the operation device is a monotonous decrease relation.

4. The work machine according to claim 1,
wherein the controller is configured to
stop generation of the supplemented design face if the operation amount of the operation device is less than a predetermined value, and
set the curvature of the supplemented design face such that a relation of the curvature of the supplemented design face relative to the operation amount of the operation device is a monotonous decrease relation if the operation amount of the operation device is equal to or more than the predetermined amount.

5. The work machine according to claim 4,
wherein the predetermined value is a value of an operation amount for an actuator to start operation, the actuator being one corresponding to an operation to the operation device among the plurality of actuators.

6. The work machine according to claim 1,
wherein
the controller is configured to set a face having a first arcuate surface and a second arcuate surface as the supplemented design face if a shape of the junction between the first design face and the second design face is upwardly protruding and the work device is moved from one side toward another side on the operation plane,
the first arcuate surface having one end thereof connected to an end portion of a design face on the one side, of the first design face and the second design face, at the same inclination as that of the design face on the one side,
the second arcuate surface having one end thereof connected to another end side of the first arcuate surface and another end thereof connected to a design face on the other side, of the first design face and the second design face, at the same inclination as that of the design face on the other side.

7. The work machine according to claim 1,
wherein the controller is configured to
calculate distances between the respective ones of the first design face and the second design face and the working point,
calculate a distance between the working point and a vicinity point nearest to the working point on the supplemented design face, and
execute the semi-automatic excavation control by selecting one with the smallest distance to the working point among the first design face, the second design face, and the vicinity point, and setting the selected design face or a tangent at the selected vicinity point as the target face.

8. The work machine according to claim 2,
wherein the controller is configured to execute the semi-automatic excavation control by calculating distances between the respective ones of the plurality of planes and the working point, and setting a plane with the smallest distance to the working point, of the plurality of planes, as the target face.

9. The work machine according to claim 1, wherein the controller is configured to change the curvature of the supplemented design face according to a position on the supplemented design face.

* * * * *